United States Patent [19]
Cutler et al.

[11] Patent Number: 5,218,712
[45] Date of Patent: Jun. 8, 1993

[54] PROVIDING A DATA PROCESSOR WITH A USER-MODE ACCESSIBLE MODE OF OPERATIONS IN WHICH THE PROCESSOR PERFORMS PROCESSING OPERATIONS WITHOUT INTERRUPTION

[75] Inventors: David N. Cutler, Bellevue; David A. Orbits, Redmond, both of Wash.; Dileep Bhandarkar, Shrewsbury, Mass.; Wayne Cardoza, Merrimack, N.H.; Richard T. Witek, Littleton, Mass.

[73] Assignee: Digital Equipment Corporation, Maynard, Mass.

[21] Appl. No.: 551,040

[22] Filed: Jul. 11, 1990

Related U.S. Application Data

[63] Continuation of Ser. No. 69,365, Jul. 1, 1987, abandoned.

[51] Int. Cl.⁵ .............. G06F 9/45; G06F 12/08; G06F 9/06; G06F 13/14
[52] U.S. Cl. .................. 395/800; 364/241.2; 364/280; 364/280.8; 364/280.4; 364/280.9; 364/281.3; 364/283.2; 364/256.3; 364/255.8; 364/DIG. 1; 364/DIG. 2; 395/375
[58] Field of Search ... 364/200 MS File, 900 MS File; 395/800, 425, 375, 400, 500, 775, 725, 200, 325

[56] References Cited

U.S. PATENT DOCUMENTS

| | | |
|---|---|---|
| 3,560,935 | 2/1971 | Beers . |
| 3,725,868 | 4/1973 | Malmer, Jr. et al. ............ 340/172.5 |
| 3,735,363 | 5/1973 | Beers et al. .................. 340/172.5 |
| 3,872,447 | 3/1975 | Tessera et al. ................. 340/172.5 |
| 3,990,052 | 11/1976 | Gruner ........................ 340/172.5 |
| 4,112,495 | 9/1978 | Easley ............................. 364/700 |
| 4,130,869 | 12/1978 | Kinoshita et al. .................. 364/200 |
| 4,172,281 | 10/1979 | Gordon .............................. 364/200 |
| 4,293,907 | 10/1981 | Huang et al. ....................... 364/200 |
| 4,386,399 | 5/1983 | Rasala et al. ...................... 364/200 |
| 4,387,423 | 6/1983 | King et al. ......................... 364/200 |
| 4,398,243 | 8/1983 | Holberger et al. ................ 364/200 |
| 4,434,459 | 2/1984 | Holland et al. ..................... 364/200 |
| 4,442,484 | 4/1984 | Childs, Jr. et al. ................ 364/200 |
| 4,456,954 | 6/1984 | Bullions et al. .................... 364/200 |
| 4,485,440 | 11/1984 | Duff et al. ......................... 395/550 |
| 4,491,912 | 1/1985 | Kainaga et al. .................... 364/200 |
| 4,494,189 | 1/1985 | Bean et al. ........................ 364/200 |
| 4,519,032 | 5/1985 | Mendell ............................. 364/200 |
| 4,674,038 | 6/1987 | Brelsford et al. .................. 364/200 |
| 4,694,391 | 9/1987 | Guttag et al. ...................... 364/200 |
| 4,740,893 | 4/1988 | Buchholz et al. ................. 364/200 |
| 4,991,078 | 2/1991 | Wilhelm et al. ................... 395/375 |

FOREIGN PATENT DOCUMENTS 0211384 2/1987 European Pat. Off. .

OTHER PUBLICATIONS

MC68020 32 Bit Microprocessor User's Manual (2nd Edition), 1988.
Harris et al., "Software links math chip to 68000-family μPs," Jan. 23, 1986, pp. 175-192.
Guttag et al., "Macrostore Firmware Emulation as an Alternative to Co-Processors," 8080 Wescon Technical Paper, vol. 26, Sep. 1982, pp. 1-5.

Primary Examiner—Thomas C. Lee
Assistant Examiner—Daniel H. Pan
Attorney, Agent, or Firm—Fish & Richardson

[57] ABSTRACT

In a data processing system employing microcode techniques, complex sequences of microinstructions can be initiated by application of a single macroinstruction. These complex sequences of microinstructions are typically noninterruptible and therefore the execution of a macroinstruction is atomic (i.e., executed as a single entity). Data processing systems that do not employ microcode typically have simpler macroinstruction sets that do not provide for a similar atomicity for complex instruction sequences. In order to obtain the same atomicity of instruction execution and to provide a nonmicrocoded data processing system with the capability to execute complex instruction sequences as an atomic operation, the nonmicrocoded data processing system is provided with a third mode, in addition to the (nonprivileged) user mode and the (privileged) kernel mode, of operation that permits the execution of instruction sequences with interrupting events disabled and certain functions and apparatus enabled to facilitate instruction sequence execution.

23 Claims, 5 Drawing Sheets

PROVIDING A DATA PROCESSOR WITH A USER-MODE ACCESSIBLE MODE OF OPERATIONS IN WHICH THE PROCESSOR PERFORMS PROCESSING OPERATIONS WITHOUT INTERRUPTION

This is a continuation of copending application Ser. No. 07/069,365 filed on Jul. 1, 1987 now abandoned.

RELATED APPLICATIONS

This application is related to the following U.S. Patent Applications.

APPARATUS AND METHOD FOR SYNCHRONIZATION OF ACCESS TO MAIN MEMORY SIGNAL GROUPS IN A MULTIPROCESSING UNIT DATA PROCESSING SYSTEM invented by David N. Cutler, David A. Orbits, Dileep Bhandarkar, Wayne Cardoza and Richard T. Witek; having Ser. No. 07/069,380; filed on Jul. 1, 1987, now abandoned, and assigned to the assignee of the present U.S. Patent Application.

APPARATUS AND METHOD FOR RECOVERING FROM MISSING PAGE FAULTS IN VECTOR DATA PROCESSING OPERATIONS invented by David N. Cutler, David A. Orbits, Dileep Bhandarkar, Wayne Cardoza and Richard T. Witek; having Ser. No. 07/069,372; filed on Jul. 1, 1987, now U.S. Pat. No. 5,063,497 and assigned to the assignee of the present U.S. Patent Application.

APPARATUS AND METHOD FOR MAIN MEMORY UNIT PROTECTION USING ACCESS AND FAULT LOGIC SIGNALS having Ser. No. 07/069,290; filed on Jul. 1, 1987, now abandoned, and assigned to the assignee of the present U.S. Patent Application.

APPARATUS AND METHOD FOR DATA INDUCED CONDITION SIGNALING having Ser. No. 07/069,285; filed on Jul. 1, 1987, now abandoned, and assigned to the assignee of the present U.S. Patent Application.

APPARATUS AND METHOD FOR CONTROL OF ASYNCHRONOUS PROGRAM INTERRUPT EVENTS IN A DATA PROCESSING SYSTEM having Ser. No. 07/069,439; filed on Jul. 1, 1987, now abandoned, and assigned to the assignee of the present U.S. Patent Application.

BACKGROUND OF THE INVENTION

1. Field of the Invention

This invention is related generally to data processing systems and, more particularly, to data processing systems that require execution of a multiplicity of instructions to execute a single macroinstruction.

2. Description of the Related Art

In complex data processing systems, a frequently used implementation tool is the use of microcoded central processing units. In this implementation technique, a data processing system instruction initiates activity in a specialized processing unit, typically referred to as a microsequencer. In response to a machine instruction, the microsequencer retrieves a sequence of special microinstructions, the microinstructions having a format that is completely unrelated to the format for data processing system instructions. These microinstructions are typically stored in a special memory called "control store". Microinstructions are also much wider than data processing instructions in complex, high performance data processing systems.

Microcoded techniques provide a means for implementing complex machine instructions that perform a multiplicity of operations as indivisible atomic units without program interruption. On the other hand, microcoded techniques have the disadvantage of requiring special fast control store and hardware logic to sequence the microinstructions. In other data processing systems, typically called "Reduced Instruction Set Computers" (RISC), microcoded techniques are not used. Instead, the data processing system is restricted to system instructions that can be implemented directly in hardware without requiring microcoded techniques. Such a restriction places additional burdens on the software programs that must cope with a data processing system which lacks the primitive operations needed.

A need has therefore been felt for a technique that allows a data processing system that does not include microcode, to provide data processing system functions that can be complex operations. Such complex operations are to be provided as atomic operations that ensure the absence of exception conditions in the hardware and noninterruptible operation.

FEATURES OF THE INVENTION

It is an object of the present invention to provide an improved data processing unit.

It is a feature to provide a technique for permitting a software program to operate on plurality of types of data processing systems.

It is another feature of the present invention to provide a technique by which a software program can operate on microcoded data processing systems and nonmicrocoded data processing systems.

It is yet another feature of the present invention to provide a data processing system operating mode for execution of instructions in addition to the usual non-privileged mode and privileged mode.

It is still another feature of the present invention to permit execution of preselected groups of instructions in an atomic manner without interruption.

It is still another feature of the present invention to provide a user mode of operation, an operating system mode of operation and a third mode of operation for executing preestablished sequences of instructions.

It is still another feature of the present invention to synchronize transitions in context environment in the data processing system.

SUMMARY OF THE INVENTION

The aforementioned and other features are accomplished, according to the present invention, by providing a data processing system with three modes for executing instruction. The user mode, in which application programs are generally executed, and the kernel mode, in which privileged instructions are typically executed, are the usual modes of a data processing system. To these modes, the present invention adds a third mode, hereinafter referred to as an EPICODE (Extended Processor Instruction Code) mode. The EPICODE mode is initiated by special EPICODE instructions or by preselected events. In the EPICODE mode of operation, events that would interrupt the execution of a normal instruction sequence are disabled while certain instructions and apparatus that facilitate execution of instructions in the EPICODE mode are enabled. The EPICODE mode provides the data processing system with the ability to have instruction atomicity, where appropriate, for instructions that are implemented by a sequence of component instructions and wherein interruption of the instruction sequence is undesirable.

These and other features of the present invention will be understood upon reading of the following description along with the drawings.

DESCRIPTION OF THE PREFERRED EMBODIMENT

1. Detailed Description of the Figures

Figure 1A:
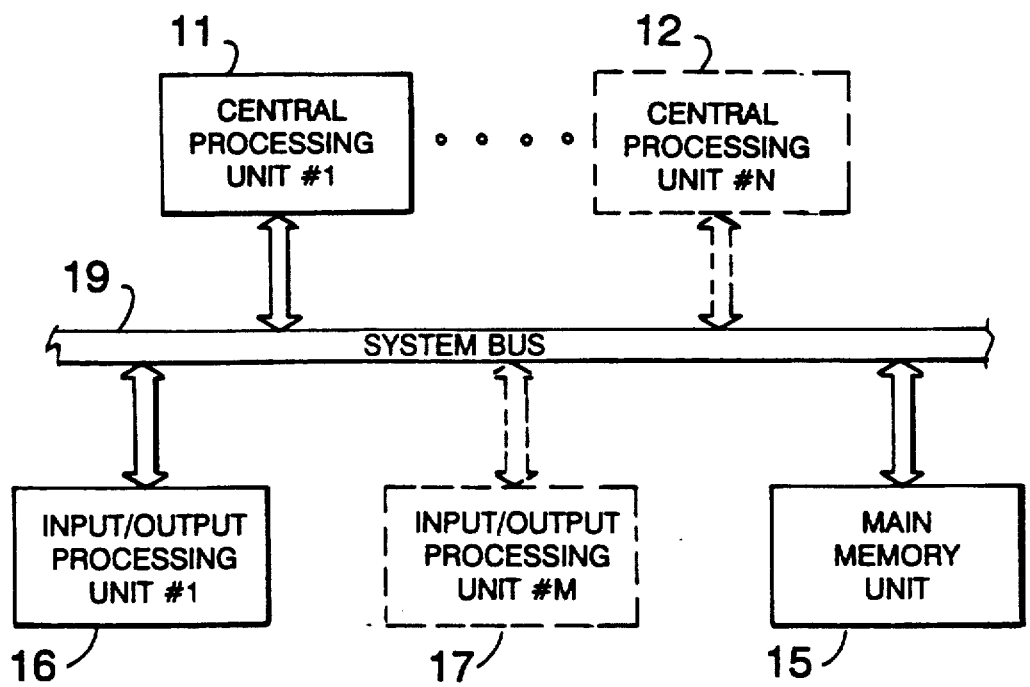
FIG. 1A and FIG. 1B are examples of data processing system implementations capable of using the present invention.
Figure 1B:
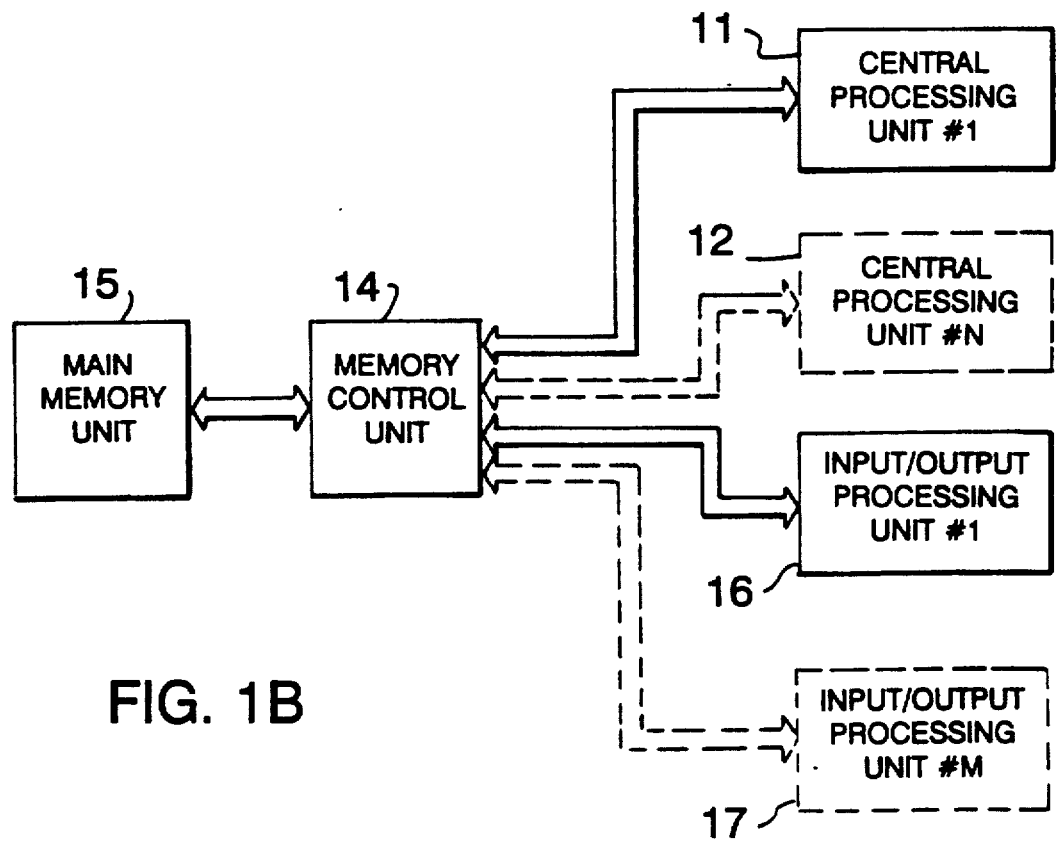

Referring now to FIG. 1A and FIG. 1B, two exemplary data processing system configurations capable of using the present invention are shown. In FIG. 1A, the central processing unit (#1) 11 is coupled to a system bus 19. Other central processing units (e.g., #N) 12 can also be coupled to the system. The central processing unit(s) 11 (through 12) process data according to the structure of the central processing unit(s) in conjunction with central processing unit control programs, the control programs being comprised of instructions resident in the main memory unit 15. The nonresident data and instructions are typically stored in the mass storage unit(s) and are transferred to and from the main memory unit 15 via the system bus 19. Input/output unit(s) {#1} 16 (through {#M} 17) couple devices such as mass memory storage units, user terminal devices and communication devices to the data processing system by means of the system bus 19. The mass storage units store the data and instructions required by the data processing unit(s). Sets of data and/or instructions, typically designated as pages of data and/or instructions, required for the operation of the central processing units 11 through 12, are transferred from the mass storage units, having relatively slow accessibility, to the main memory unit to which access by the central processing unit is relatively fast. The bus oriented system has an advantage in the relative ease to reconfigure the system but has the disadvantage that each system component requires control apparatus to provide an interface with the system bus. Referring next to FIG. 1B, a data processing system is shown in which the central processing unit(s) 11 (through 12) and the input/output unit(s) 16 (through 17) are coupled to the main memory unit 15 through a memory control unit 14, the memory control unit 14 replacing the system bus 19 and the control function performed by individual data processing system components in the bus oriented data processing configuration shown in FIG. 1A. The memory control unit 14 provides a centralized control and monitoring of the transfer of data and instructions that can be more efficient than the bus oriented configuration of FIG. 1, but with the loss of flexibility.

Figure 2:
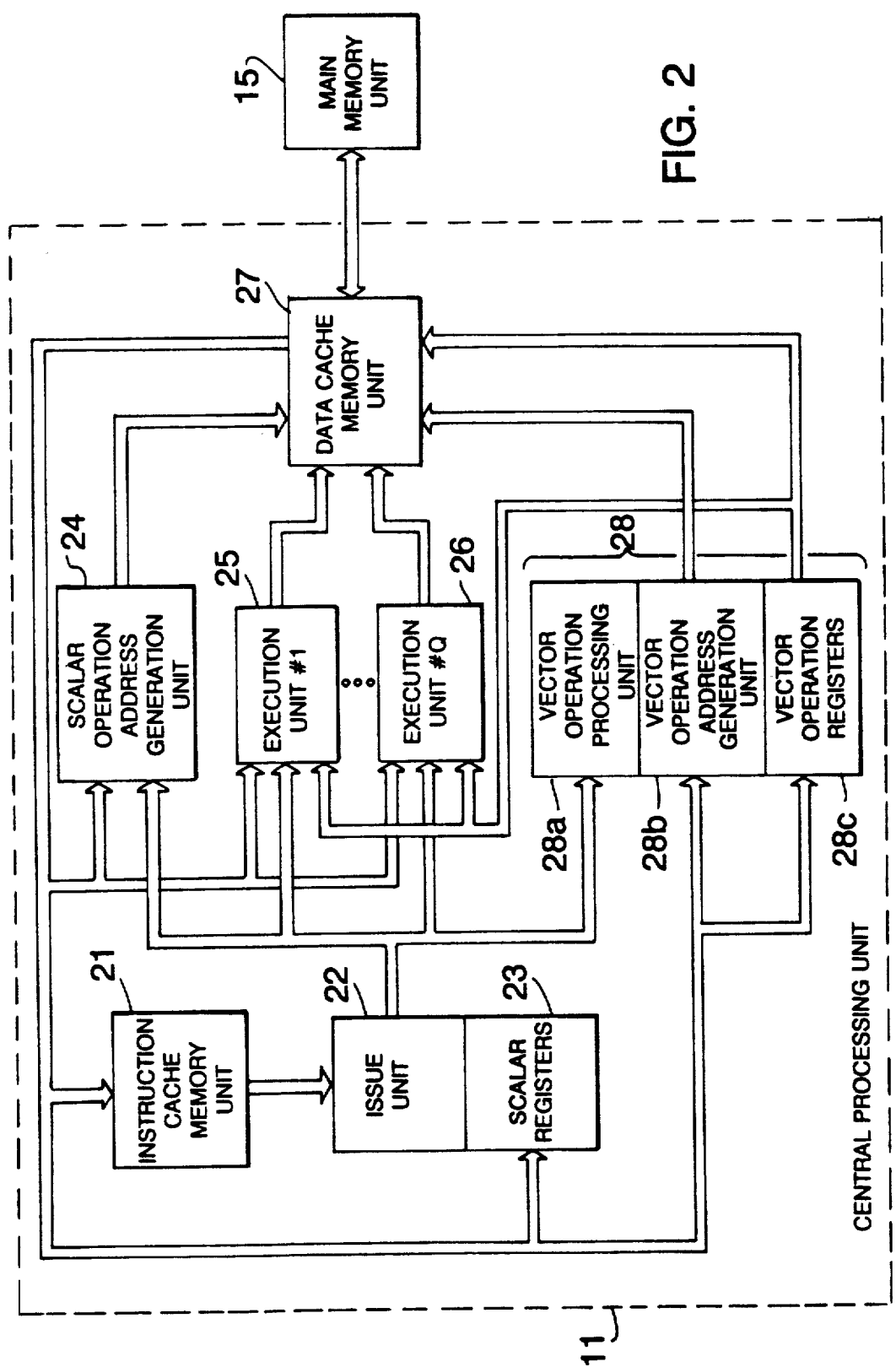
FIG. 2 is an example of a central processing unit of a data processing unit capable of using the present invention.

Referring next to FIG. 2, a block diagram of an exemplary central processing unit capable of effective utilization of the present invention is illustrated. The issue unit 22 is responsible for providing (decoded) instructions to the plurality of specialized execution units comprising the scalar operation address generation unit 24, at least one execution unit (#1) 25 (through execution unit {#Q} 26) and a vector operation unit 28, the vector operation unit 28 including vector operation processing unit 28A, vector operation address generation unit 28B and vector operation registers 28C. The data processed by the execution units are typically extracted from the scalar registers 23 or the vector registers 28C. The resulting data from the execution units are stored in the scalar registers 23, in the vector registers 28C or in the data cache memory unit 27. The data cache memory unit 27 can be viewed as a cache memory unit providing an interface between the main memory unit 15 and the central processing unit 11. (The data cache memory unit 27 is shown as being coupled directly to the main memory unit in FIG. 2. As illustrated in FIG. 1A and FIG. 1B, the actual coupling can include intervening data processing apparatus.) The issue unit 22 includes apparatus for determining which execution unit will process selected data and for determining when the selected execution unit is available for processing data. This latter feature includes ascertaining that the destination storage location will be available to store the processed data. The instruction cache memory unit 21 stores the instructions that are decoded and forwarded to the appropriate execution unit by the issue unit. The issue unit 22 has the apparatus to attempt to maximize the processing operations of the execution units. Thus, the issue unit 22 includes prefetch apparatus and algorithms to ensure that the appropriate instruction (including any branch instruction) is available to the issue unit 22 as needed. The plurality of execution units are, as indicated by the scalar operation address generation unit 24 and the vector operation unit 28, specialized processing devices for handling certain classes of processing operation. For example, an execution unit can be configured to handle floating point operations, or integer arithmetic operations, etc. The issue unit 22 has associated therewith scalar registers 23 that can store data required for the execution of the program or for providing a record of the data processing operation. For example, one register is the Program Counter register that stores the (virtual) address of the next instruction, in the executing program instruction sequence, to be processed. The scalar operation address generation unit 24 is used to convert virtual addresses to physical locations in the main memory unit 15. The issue unit 22 is also responsible for reordering the data from the execution units in the correct sequence when the execution units process instructions at different rates.

The vector operation unit 28 includes a vector operation processing unit 28A, a vector operation address generation unit 28B and vector operation registers 28C. The activity of the vector operation processing unit can control the distribution of the data to the execution units 24 through 26 and the execution of the instructions therein. According to another embodiment (not shown), execution units dedicated to execution of instructions by the vector operation unit 28 can be available in the data processing system. When the execution units are available for both vector and scalar operations, control is subject to the overall system control of the issue unit 22 that allocates the resources of the data processing unit.

Figure 3:
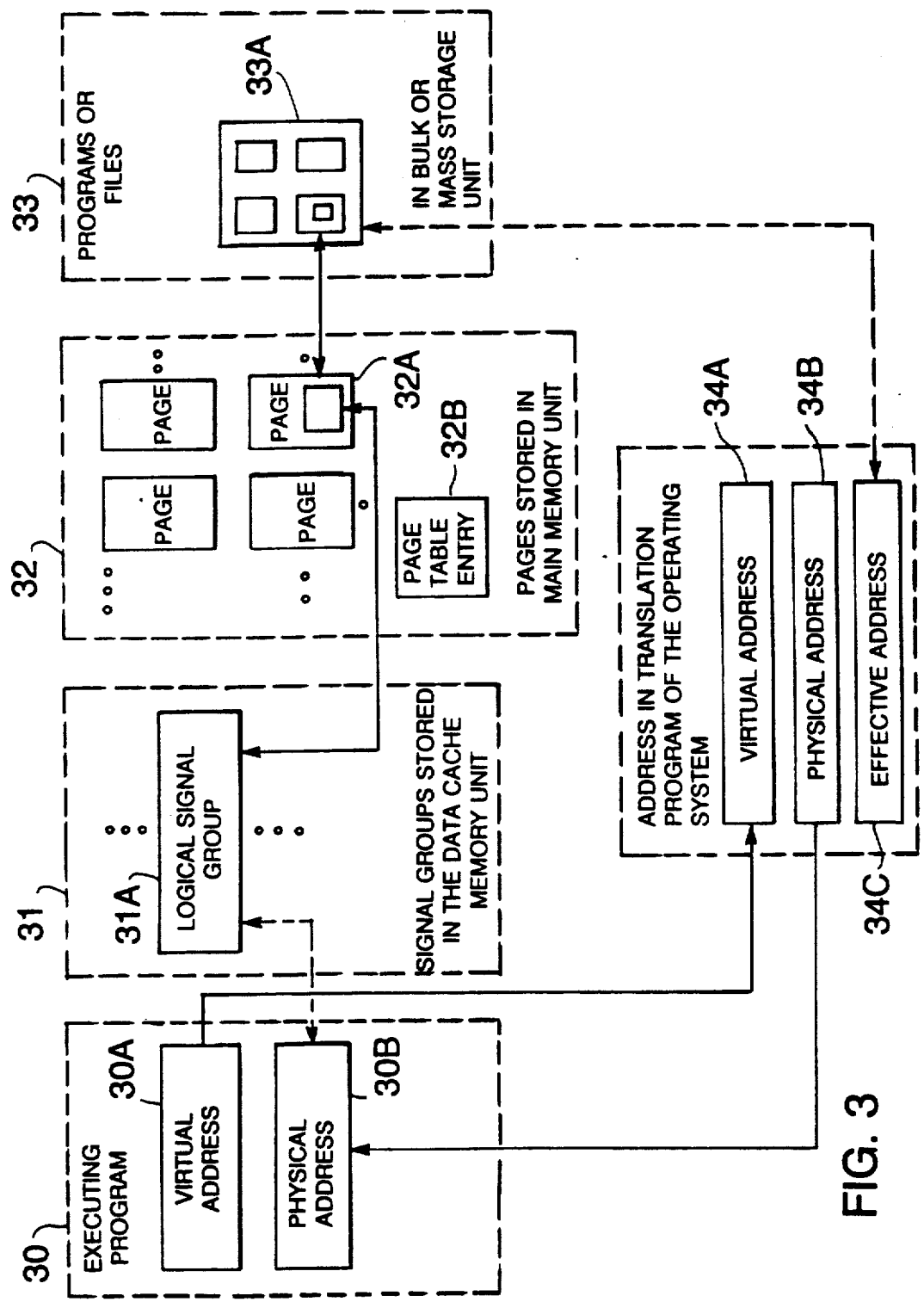
FIG. 3 is an illustration of a virtual memory data processing system organization.

Referring next to FIG. 3, a description of the virtual addressing mechanism of the preferred embodiment is illustrated. An instruction 301 in the issue unit has associated therewith a virtual address 302 identifying the data element upon which the operation of the instruction is to be performed. The issue unit transfers the virtual address 302 to scalar address generation unit 24 (or, where appropriate, the vector address generation unit 28B). In the address generation unit 24 (or 28B) a portion of the virtual address is used to identify (by apparatus 303 in the address generation unit) a page table entry 304 in main memory unit 15. The page table entry 305 is transferred to the address generation unit 24 (or 28B) and apparatus 305 tests selected fields in the page table entry to determine if the access being attempted with respect to data element is permitted. When the access is not permitted, then an access violation 306 is identified and an appropriate operating system program is invoked to determine how to respond to the access violation. When the test 305 determines that the access to data element 312 is permitted, then a test 307 is performed on page table entry 304 to determine if the data element required for the instruction is available in the main memory unit 15. When the test 307 indicates that the data element is not present, then a page fault 308 is generated and an appropriate operating system program transfers the data element to the main memory 15 (in location 312), updates the related page table entry 304 and re-executes the instruction incurring the page fault. If the required data element is available in the main memory unit, as determined by test 307, then test 309 tests the page table entry 304 to determine if the activity for which the data element is required by the associated instruction is designated as resulting in a fault. When the activity determined by the instruction is designated as a fault condition, then a fault on read, a fault on write or a fault on execute, as appropriate, will invoke an operating system program to respond to the fault condition. If the test 309 indicates that the activity of the instruction with respect to the associated data element is not designated as a fault condition, then the address generation unit 24 (or 28B) determines the physical address 311 in the main memory unit 15 where the required data element is stored. The data element 312 at this address is transferred to a storage location 313 in the scalar registers 23, the vector operation registers 28C or to the instruction cache memory unit 21 (i.e., when the data element is an instruction). In this manner, the required data element, identified by a virtual address, is available for processing by the instruction 301.

Figure 4:
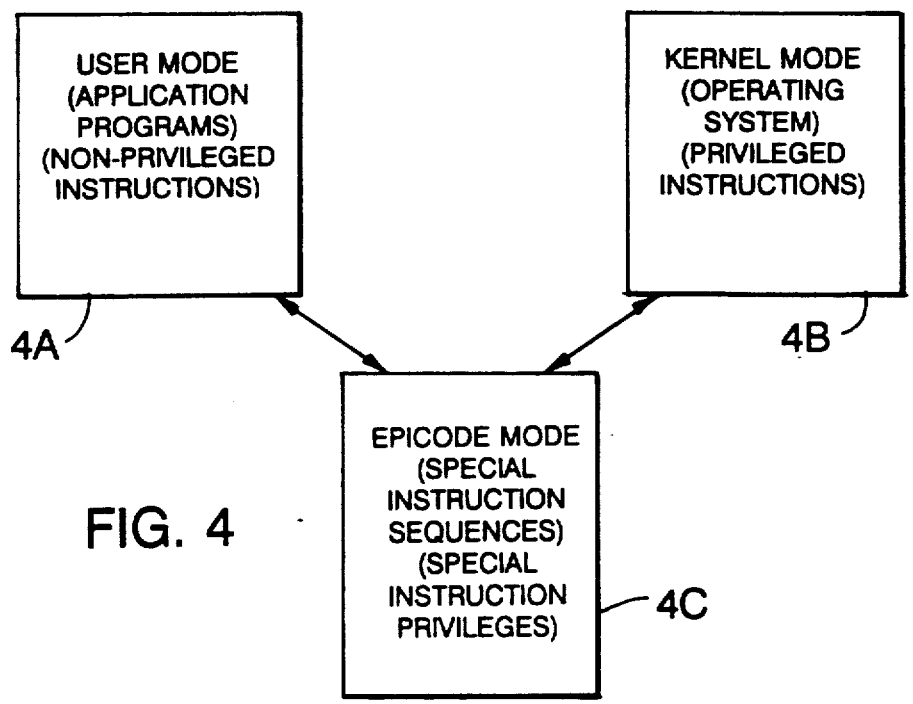
FIG. 4 is a diagrammatic illustration of the relationship of the data processing system operating modes.

Referring next to FIG. 4, the relationship of the two typical operating system modes and the EPICODE mode is shown. The user mode 4A typically executes application type programs that perform processing functions of immediate interest to the user. The user is provided with relatively complete control in order to obtain the desired processing capabilities. The instructions are typically nonprivileged in the sense that the order and selected aspects of the instruction are under control of the user. The kernel mode 4B is the mode in which the operating system executes instructions. The kernel mode executes all instructions available in the user mode as well as additional instructions associated with the kernel mode 4B that are privileged and therefore are not available for manipulation by a user. Privileged instructions are not allowed in user mode because they could compromise the security of other users or programs. The EPICODE mode of data processing system operation is reserved for instruction sequences that should execute without interruption and/or should not execute unless the data processing system is in a predetermined state. Some instructions that can be executed in user mode 4A or in kernel mode 4B require a transition into the EPICODE mode 4C. This mode is provided with certain privileges and certain dedicated hardware implementing the strategy to ensure noninterruptible (atomic) execution of the instruction sequence.

Figure 5:
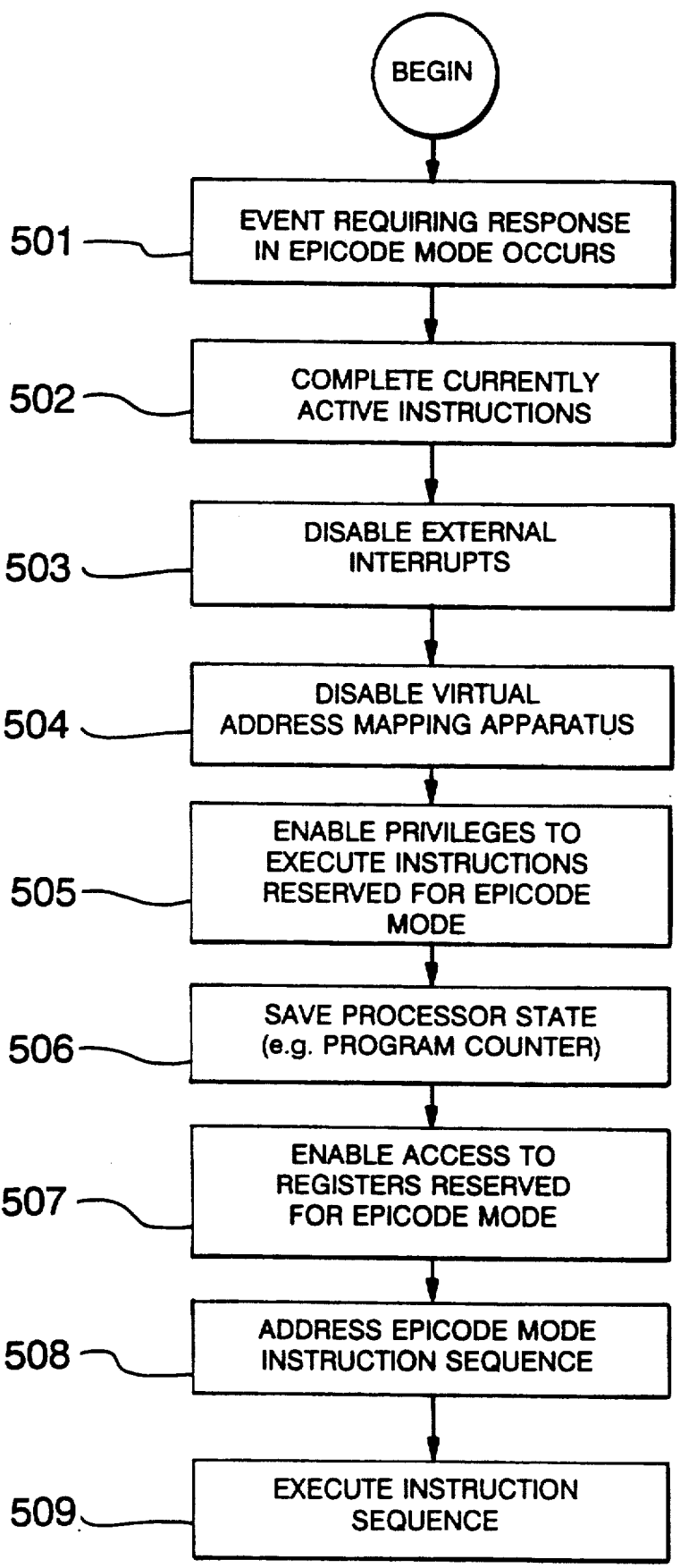
FIG. 5 illustrates the steps in transferring from the user or kernel mode to the EPICODE mode.

Referring next to FIG. 5, the steps for entering the EPICODE mode from either of the operating modes is shown. An event 501, such as an interrupt, a hardware exception or an instruction in the EPICODE format communicates to the data processing system the requirement to enter the EPICODE mode. In step 502, the issue unit is prevented from issuing new instructions, but the instructions for which execution has begun are completed. The completion of currently executing instructions permits all hardware exceptions to be signaled prior to execution in the EPICODE mode. In step 503, the external interrupts are disabled and the virtual address mapping for instruction stream references is disabled in step 504. In step 505, the privilege to execute special instructions reserved for the EPICODE mode is enabled. In step 506, any processor state that would be destroyed by the execution in the EPICODE mode is saved. For example, the contents of the Program Counter are saved in this step. Access to a special set of registers associated with the EPICODE mode is enabled in step 507. A new Program Counter address is formed by combining an address from a hardware register (called the EPICODE base address register) with certain status signal flags in step 508. And in step 509, the sequence of ordinary and EPICODE instructions forming the addressed EPICODE mode program are executed.

Figure 6:
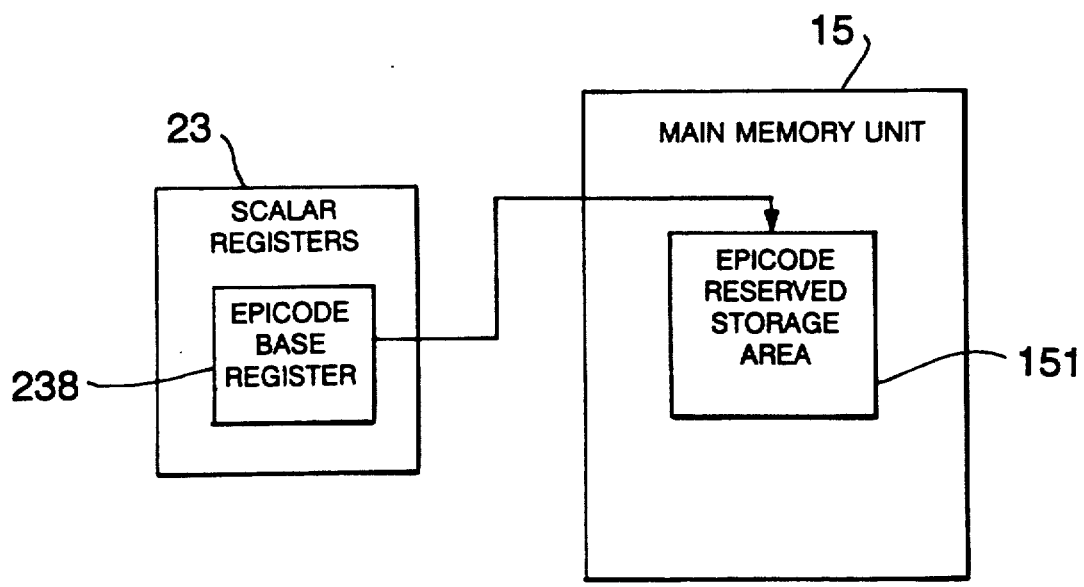
FIG. 6 illustrates that the EPICODE instruction sequences are stored in reserved areas of the main memory unit.

Referring to FIG. 6, the main memory unit 15 has a reserved area 151 in which the EPICODE-related instruction sequences are stored. This information is addressed from the EPICODE base address register 238. Register 238 can be one of a plurality of registers available only to the EPICODE mode (e.g., access being enabled by preestablished bit positions). Certain flags and status signals can be used to determine the off-set from the base address for instruction sequences responsive to the conditions producing the flags or status signals.

2. Operation of the Preferred Embodiment

The central processing unit having pipelined execution units of FIG. 2 was implemented in the preferred embodiment subject to several constraints, however, other design implementations can utilize the present invention. The central processing unit includes a plurality of execution units, each execution unit adapted to execute a class of instructions. By way of example, one execution unit, the scalar address generating unit 24, controls the transfer of the data between the central processing unit and the main memory unit, i.e., executes the scalar load/store instructions. One execution unit is adapted to execute data shifting operations, one execution unit for floating point add/subtract operations, one execution unit is adapted for integer and floating point multiply operations and one execution unit is adapted for integer and floating point divide operations. The specialized execution units can be, but are not necessarily implemented in a pipelined configuration. The other features of the central processing unit are the following. The instruction in the currently executing sequence of instructions is transferred to the issue unit 22 from the instruction cache memory unit 21. In the issue unit, the instruction is broken down into its constituent parts and data-dependent control signals and address signals are generated therefrom. However, before an instruction can begin execution (i.e., be issued), several constraints must be satisfied. All source and destination registers for the instruction must be available, i.e., no write operations to a needed register can be outstanding. The register write path must be available at the future cycle in which this instruction will store the processed quantity. The execution unit to be required for processing the instruction during the execution must be available to perform the operation. With respect to the vector operation unit, a vector operation reserves an execution unit for the duration of the vector operation. When a memory load/store instruction experiences a cache memory unit miss, the load/store unit busy flag will cause the subsequent load/store instructions to be delayed until the cache memory miss response is complete. When an instruction does issue, the destination register and the write path cycle for the result are reserved. During operand set-up, all instruction-independent register addresses are generated, operands are read and stored, and data-dependent control signals are generated. The instruction operands and control signals are passed to the associated execution unit for execution. The result generated by the execution unit is stored in the register files or in the data cache memory unit 15 as appropriate. Once an instruction issues, the result of the processing may not be available for several machine cycles. Meanwhile, in the next machine cycle, the next instruction can be decoded and can be issued when the requisite issue conditions are satisfied. Thus, the instructions are decoded and issued in the normal instruction sequence, but the results can be stored in a different order because of the of the varying instruction execution times of the execution units. This out of order storing complicates the exception handling and the retry of failing instructions. However, these events are relatively rare and the out of order storing provides execution and hardware advantages.

With respect to FIG. 3, the use of virtual addressing techniques has been widely implemented. This technique permits the programmer not to be concerned with actual location of the data and instruction elements, the address generation mechanism providing an interface between the program addresses and the data and instruction elements within the data processing unit. By the use of pages of data and instruction elements, the transfer of data and instruction elements from the bulk or mass store media is expedited, there being no need to transfer individual data and instruction elements. In addition, programs are generally written in a format that stores data and instruction elements needed for sequential instruction execution relatively close together in the program or file. Thus, a page of data and instruction elements will typically include a multiplicity of related data and instruction elements for program execution. None-the-less, the relative rigidity of the granularity of the page implementation has the result, particularly in the vector instruction execution, that the group of related data and instruction elements can extend beyond the page boundary to a page not present in the main memory unit of the data processing system. The data processing system typically includes procedures associated with the virtual addressing techniques, such as the apparatus for signaling that the required information page is not in the main memory unit as well as the programs for responding to a page fault by retrieving the missing page of information.

The data processing system described above is typical and can be implemented in a multiplicity of ways. In particular, microcoding techniques are optional in implementing such a structure. When microcoding techniques are not employed, many requisite functions of the data processing system require complex sequencing, but none-the-less must be performed atomically to other activity in the central processing unit. Some examples of such functions include:

1. Interrupt and exception dispatching,
2. Memory management control functions such as translation buffer fill,
3. Instructions that require complex sequencing such as the Return from Exception or Interrupt (REI) instruction,
4. Instructions that require controlled access to processor resources such as instructions that result in memory unit interlock,
5. Instructions that require an architected interface across all implementations for software compatibility, but whose physical implementation may vary widely between implementations. Examples include the Return from Exception and Interrupt and the Move To/From Processor Register.

These functions are easily implemented in the microcoded data processing systems. The EPICODE mode provides a technique to implement these instructions in data processing systems which are not implemented using micro instruction techniques.

The EPICODE mode is entered, in the preferred embodiment, when any of the following events are identified in the data processing system. An interrupt signal is received from an external input/output device or from another processor. A hardware exception is generated by the currently executing program. Or an EPICODE format instruction is executed to perform a complex instruction atomically. The EPICODE instruction sequence is executed in an atomic and generally noninterruptible manner in order to respond to these events.

Because the EPICODE mode is used as a transition mode between operating modes in the data processing system, the entry into the EPICODE mode automatically permits any currently executing instructions to complete execution before entry into the mode. In this manner, exceptional events can be responded to within the context environment in which the events occurred and prior to transition into the EPICODE mode. The EPICODE mode synchronizes the transitions between modes of operation including to and from the EPICODE mode.

In the preferred embodiment, an instruction requiring execution in the EPICODE mode has a special format. In addition, the instruction repertoire available to implement an EPICODE instruction can include the software instruction set as well as specialized instructions to implement the specialized activity reserved for execution in the EPICODE mode. The EPICODE mode has a multiplicity of dedicated registers (in the scalar register unit 23) available to increase the performance and flexibility in this operating mode. The EPICODE mode, therefore, provides the enabling mechanism for interaction with the reserved registers.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A data processor for processing programs and for servicing interrupt requests that are applied to said data processor, comprising:

processing means for performing processing operations in at least three privilege modes, including a user mode, a kernel mode, and a third mode;

control means for controlling said processing means in relation to said privilege modes, said control means enabling said processing means to temporarily suspend said processing operations and service said interrupt requests when said processing means is processing operations in either the user mode or the kernel mode, and inhibiting said processing means from suspending said processing operations and servicing said interrupt requests when said processing means is processing operations in the third mode; and said control means including means responsive to a selected instruction processed by said processing means when said processing means is processing operations in said user mode for causing said processing means to switch from said user mode to said third mode and atomically execute a sequence of instructions in said third mode that is associated with said selected instruction.

2. The data processor of claim 1 wherein instruction sequences executing in said third mode of operation are stored in a reserved portion of a main memory unit.

3. The data processor of claim 1 wherein said data processor utilizes virtual addressing techniques, said virtual addressing techniques being disabled for instruction stream references during operation by said data processor in said third mode.

4. The data processor of claim 1 wherein said control means enables procedures responsive to interrupting events to be executed in said third mode of operation.

5. The data processor of claim 1 wherein said control means enable said third mode of operation to be entered from said user mode of operation and from said kernel mode of operation.

6. The data processor of claim 1 wherein said data processor has a plurality of registers, said control means enabling, said processing means to use said registers only when said data processor is in said third mode of operation.

7. The data processor of claim 1 wherein said data processor includes apparatus for responding to interrupt conditions, said control means disabling, said interrupt responsive apparatus when said data processor is in said third mode.

8. The data processor of claim 1 wherein said control means enables said processing means to execute a plurality of overlapping instructions in said user mode and said kernel mode, said control means enabling, said processing means to complete execution of all currently executing instructions in said user and kernel mode prior to entering said third mode.

9. The data processor of claim 1 wherein the control means enables the processing means to execute non-privileged instructions when operating in the user mode privileged or non-privileged instructions in the kernel mode, and non-interruptible sequences of instructions in the third mode.

10. The data processor of claim 9 wherein said noninterruptible sequences of instructions include special instructions in addition to said privileged and non-privileged instructions.

11. The data processor of claim 9 wherein said execution of said noninterruptible sequences of instructions is a response to an exception and to an interrupt event.

12. The data processor of claim 1 wherein said control means enables said processor means to process operations in said user mode and then in said third mode, without performing an intermediate operation in said kernel mode.

13. The data processor of claim 1 wherein said operations processed in said third mode are under the control of a user.

14. The data processor of claim 1 wherein said operations processed in said third mode are the result of instructions contained in an applications program.

15. The processor of claim 1 wherein said processing means does not include microcode for performing said operations that are processed in said third mode.

16. The processor of claim 1 wherein said control means is adapted to control different types of said processing means.

17. The processor of claim 16 wherein at least one of said different types of processing means does not include microcode for performing said operations that are processed in said third mode.

18. A method of operating a data processor, comprising the steps of:

enabling said processor to perform processing operations in at least three privilege modes, including a user mode, a kernel mode, and a third mode;

enabling said processor to temporarily suspend said processing operations and service interrupt requests when said processor is processing operations in either the user mode or the kernel mode;

inhibiting said processor from suspending said processing operations and servicing interrupt requests when said processor is processing operations in the third mode; and causing said processor, when processing operations in said user mode, to respond to a selected instruction by switching from said user mode to said third mode and then atomically executing a sequence of instructions in said third mode that is associated with said selected instruction.

19. The method of claim 18 wherein said method is adapted to operate different types of said data processor.

20. The method of claim 19 wherein at least one of said types of data processor does not include microcode for performing said operations that are processed in said third mode.

21. A method of operating a data processor which executes instructions in a user mode of operation and a kernel mode of operation, comprising the steps of:

allowing said processor to temporarily suspend executing said instructions and service interrupt requests when said processor is operating in said user mode or said kernel mode; and causing said processor to respond to a predetermined instruction executed in said user mode by executing a selected sequence of instructions, and inhibiting said processor from suspending execution of said sequence and servicing interrupt requests while said processor is executing said sequence so that said processor executes said sequence atomically.

22. The method of claim 21 wherein said method is adapted to operate different types of said data processor.

23. The method of claim 22 wherein said data processor performs a selected operation by executing said sequence, at least one of said types of data processor not including microcode for performing said selected operation.

* * * * *

UNITED STATES PATENT AND TRADEMARK OFFICE
CERTIFICATE OF CORRECTION

PATENT NO. : 5,218,712

DATED : June 8, 1993

INVENTOR(S) : David N. Cutler et al.

It is certified that error appears in the above-identified patent and that said Letters Patent is hereby corrected as shown below:

On the title page, item: [54], and column 1, line 4:
In the Title: the first appearance of "OPERATIONS" should be --OPERATION--.

Column 1, line 46, "07/069,439" should be --07/069,436--.

Signed and Sealed this

Twelfth Day of September, 1995

Attest:

BRUCE LEHMAN

Attesting Officer     Commissioner of Patents and Trademarks